US006970836B1

(12) United States Patent
Paltenghe et al.

(10) Patent No.: US 6,970,836 B1
(45) Date of Patent: Nov. 29, 2005

(54) SYSTEM AND METHOD FOR SECURELY STORING ELECTRONIC DATA

(75) Inventors: Cris T. Paltenghe, Northridge, CA (US); Alnoor B. Mamdani, Venice, CA (US); Lisa Ezrol, New York, NY (US); Charles Golvin, Los Angeles, CA (US); Henry Lichstein, Santa Monica, CA (US); Melvin Michio Takata, Thousand Oaks, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/291,294

(22) Filed: Apr. 14, 1999

Related U.S. Application Data

(60) Provisional application No. 60/081,748, filed on Apr. 14, 1998.

(51) Int. Cl.$^7$ ............................................. G06F 17/60
(52) U.S. Cl. ............................ 705/18; 705/17; 705/53; 380/286
(58) Field of Search ............................ 705/17, 18, 53, 705/51, 67; 380/277, 286

(56) References Cited

U.S. PATENT DOCUMENTS

| 5,416,841 | A | | 5/1995 | Merrick .................. 380/29 |
| 5,436,972 | A | | 7/1995 | Fisher .................... 380/25 |
| 5,453,601 | A | * | 9/1995 | Rosen ................... 235/379 |
| 5,492,268 | A | | 2/1996 | Biddle et al. ............ 299/67.1 |
| 5,852,713 | A | * | 12/1998 | Shannon ............... 395/182.04 |
| 6,003,764 | A | * | 12/1999 | De Rooij et al. ........ 235/379 |
| 6,009,177 | A | * | 12/1999 | Sudia ..................... 380/25 |
| 6,141,423 | A | * | 10/2000 | Fischer .................. 380/286 |
| 6,272,632 | B1 | * | 8/2001 | Carman et al. ........... 713/168 |

FOREIGN PATENT DOCUMENTS

| EP | 917120 A2 | * | 5/1999 | ............ G07F 19/00 |
| WO | WO-200028452 A1 | * | 5/2000 | ............ G06F 17/60 |

OTHER PUBLICATIONS

Public Legal Education Society of Nova Scotia, "Information for Executors and Administrators," Downloaded from internet Jan. 1, 2001, www.chebucto.ns.ca/Law/PLENS/info-ex.html, 17 pages.*

Perry, Tekla S., "Electronic Money: Toward a virtual wallet, " IEEE Spectrum, pp. 18-19, Feb. 1997.*

Baldwin et al., "Locking the E-Safe," IEEE Spectrum, pp. 40-46, Feb. 1997.*

Gunnerson, Gary, "A Virtual Wallet," PC Magazine, Nov. 22, 1999 (downloaded from internet Jan. 12, 2001), www.zdnet.com/pcmag/stories/reviews/0,6755,2394029,00.html, 3 pages.*

* cited by examiner

*Primary Examiner*—Marc Norman
(74) *Attorney, Agent, or Firm*—George T. Marcou; Kilpatrick Stockton LLP (57) ABSTRACT

A system and method for securely storing data provides for storing, managing, and updating an owner's secret data and for accessing the stored data by a trusted third party upon the occurrence of an event, such as the death of the owner. The system and method makes use of application software, such as a virtual wallet running at least in part on the server of a trusted third party and with a virtual executor function and a virtual archivist function. The virtual executor function automatically escrows a trusted third party's access aspect of the owner's secret device for accessing the stored data. Upon verification of the occurrence of the event, the virtual executor provides access to the stored data using the trusted third party's access aspect. The virtual archivist function automatically updates technologies related to the stored data.

36 Claims, 6 Drawing Sheets

VIRTUAL ARCHIVIST—46

| | |
|---|---|
| 48 | Technologies Used to Sign Documents |
| 50 | Technology to Encrypt/Decrypt |
| 52 | Keys for Signing Documents |
| 54 | Documents Themselves |
| 55 | File Translation Utilities |
| 56 | Certificate Revocation Lists |
| 57 | Digital Certificates |
| 58 | Time Stamps |
| 60 | Notary Stamps |

FIG. 6

SYSTEM AND METHOD FOR SECURELY STORING ELECTRONIC DATA

CROSS REFERENCE TO RELATED APPLICATIONS

This application is related to now abandoned U.S. Provisional Patent Application Ser. No. 60/081,748, entitled "Virtual Wallet System", filed Apr. 14, 1998; co-pending U.S. patent application Ser. No. 09/190,993, entitled "Virtual Wallet System", filed Nov. 12, 1998; U.S. patent application entitled "System and Method for Controlling Transmission of Stored Information to Internet Websites", Ser. No. 09/291,295 filled Apr. 14, 1999; and, U.S. patent application entitled "Digital Graphic Signature System", Ser. No. 09/290,427 filed Apr. 13, 1999; all of which are incorporated herein by reference.

FIELD OF THE INVENTION

This invention relates generally to storage of electronic data, and more particularly to a system and method for securely storing, managing and updating an owner's data and accessing the stored data by a trusted party upon the occurrence of an event, such as the death of the owner.

BACKGROUND

An electronic or virtual wallet is an embodiment of software acting as a container for electronic objects, such as payment mechanisms, identity authentication mechanisms, personal information and electronic artifacts of the owner. The electronic or virtual wallet can reside, for example, on one or more of a consumer's personal computer (PC), a server, and a smart card. The virtual wallet allows the owner to control access to and distribution of information in the wallet, thereby giving the owner security and total control over the owner's personal information. Further, the virtual wallet provides mechanisms that eliminate the risk of loss of the information in the wallet, for example, by remotely storing and/or disabling the wallet contents. Thus, the virtual wallet is a trusted place to keep information and valuable financial items, as well as a convenient way to move information around.

Currently, many electronic wallets focus on payment mechanisms. However, electronic wallets can also be used to maintain, for example, identification information, authentication information, certificates, access keys, personal identification numbers (PIN's), and credit card, debit card and bank account information, as well as all other types of personal information of the owner, such as the owner's will. For a detailed discussion of a virtual or electronic wallet, see, for example, currently abandoned Provisional Patent Application Ser. No. 60/081,748 filed on Apr. 14, 1998 and patent application Ser. No. 09/190,993 filed on Nov. 12, 1998, incorporated herein by reference. Information stored in an electronic wallet can be transmitted and received by the owner of the electronic wallet, for example, through the Internet or other types of networks.

Typically, a local aspect of the virtual wallet resides on the owner's personal computer (PC) and includes a certificate or other similar authentication instrument that allows the owner to remotely gain access to the entire virtual wallet which resides, for example, on a server. The local aspect of the virtual wallet updates the remote aspect of the virtual wallet with the latest information from the local aspect when the local wallet is on-line. The server also affords greater storage capacity for the owner's information than, for example, the owner's PC. Thus, the owner is able to define and have access to all the wallet functionality at sites where the local aspect of the wallet can be linked to the server, while the remote aspect of the wallet provides security for all of the information stored in the wallet.

However, the certificate or other similar authentication mechanism, such as a special PIN, password or key that allows the owner to gain access to the owner's electronic data securely stored in the virtual wallet may typically be known only to the owner. Therefore, upon the occurrence of an event, such as the death of the owner, which makes it impossible for the owner to act, if no other person knows how to access the stored information, it may be locked up forever.

SUMMARY OF THE INVENTION

It is a feature and advantage of the present invention to provide a system and method for securely updating and managing an owner's electronic data stored in the owner's virtual wallet.

It is another feature and advantage of the present invention to provide a system and method for updating technologies associated with the owner's data stored in the owner's virtual wallet when such technologies become outdated.

It is an additional feature and advantage of the present invention to provide a system and method for accessing the owner's data stored in the owner's virtual wallet upon the occurrence of an event, such as the death of the owner.

It is a further feature and advantage of the present invention to provide a system and method for making the contents of the owner's virtual wallet available to the owner's estate upon the death of the owner.

To achieve the stated and other features, advantages and objects of the present invention, an embodiment of the present invention provides a system and method for securely storing, managing and updating an owner's secret data and accessing the stored data by a trusted third party upon the occurrence of an event, such as the death of the owner. An embodiment of the present invention makes use of application software, such as a virtual wallet application running, for example, at least in part on the owner's personal computer and at least in part on a wallet server of a trusted third party, such as a bank or similar financial institution. The virtual wallet application also includes, for example, a virtual executor function and a virtual archivist function.

In an embodiment of the present invention, data is stored for the owner by the owner entering the data on the virtual wallet application at a terminal, such as the owner's personal computer, which is coupled to the wallet server over a network, or by receiving the data from another party, such as a merchant, lawyer, or the like, for the owner, by an electronic transmission, such as an electronic mail message. The network can be a private network or a public network, such as the internet. The types of secret information entered by the owner and stored for the owner by the virtual wallet application includes, for example, identification information, authentication information, certificate information, access key information, PIN number information, credit card account information, debit card information, bank account information, and/or other personal information, such as will information, legal documents, insurance policies, brokerage account information, digital bearer instruments, digital stock certificates, and digital bond certificates.

An embodiment of the present invention involves establishing the virtual wallet for the owner for various payment functions, as well as for storing the owner's secret data. The virtual wallet application automatically assigns the owner a secret device, such as a password, secret key, PIN number, or the like, for access by the owner to the stored data, and automatically sends information about the secret device to the owner, for example, at the owner's terminal or PC coupled to the wallet server over the network. The owner's secret access device has, for example, two "flavors" or aspects, namely the owner's access aspect and the trusted third party's access aspect. The owner's access aspect is automatically sent to the owner, and the trusted third party's access aspect is automatically stored by the virtual executor function of the virtual wallet application.

In an embodiment of the present invention, the third party's access aspect of the secret device is automatically escrowed by the virtual executor function of the virtual wallet application conditioned on the occurrence of an event affecting the owner, which makes it impossible for the owner to act, such as the death or incompetence of the owner. Other secret access information is likewise automatically escrowed for the owner by the virtual executor function of the virtual wallet application, such as identification information, authentication information, certificate information, access key information, PIN number information, and password information of the owner. Likewise, various decryption infrastructure is also automatically escrowed for the owner by the virtual executor function, such as public key cryptography infrastructure, electronic document infrastructure, digital signature infrastructure, user name infrastructure, password infrastructure, fingerprint scanner infrastructure, and secret key infrastructure of the owner.

In an embodiment of the present invention, upon the occurrence of the event, such as the death or incompetence of the owner, the owner's personal representative, such as the executor or trustee of the owner's estate, presents appropriate documentation to the trusted third party necessary to verify the occurrence of the event and the representative's authority to act. Verification of the occurrence of the event is entered on the virtual executor function of the owner's virtual wallet application, and the virtual executor function automatically provides access to the owner's stored data using the escrowed information, such as the trusted third party's access aspect of the owner's secret key.

An embodiment of the present invention also includes the virtual archivist function of the owner's virtual wallet, which automatically updates the technology aspects of the stored data from time to time. The technology aspects updated by the virtual archivist include, for example, technology relating to signing a document, encryption/decryption technology, technology related to a key for signing a document, technology related to reading a document itself, technology related to translation utilities used to make the documents themselves accessible, and technology related to a certificate revocation list. Other technology aspects updated by the virtual archivist include verification and validation technology to ensure that keys, digital certificates, and notary stamps are valid as of the time stamp date associated with the documents themselves.

Additional objects, advantages, and novel features of the invention will be set forth in part in the description that follows, and in part will become more apparent to those skilled in the art upon examination of the following, or may be learned by practicing the invention.

DETAILED DESCRIPTION

Figure 1:
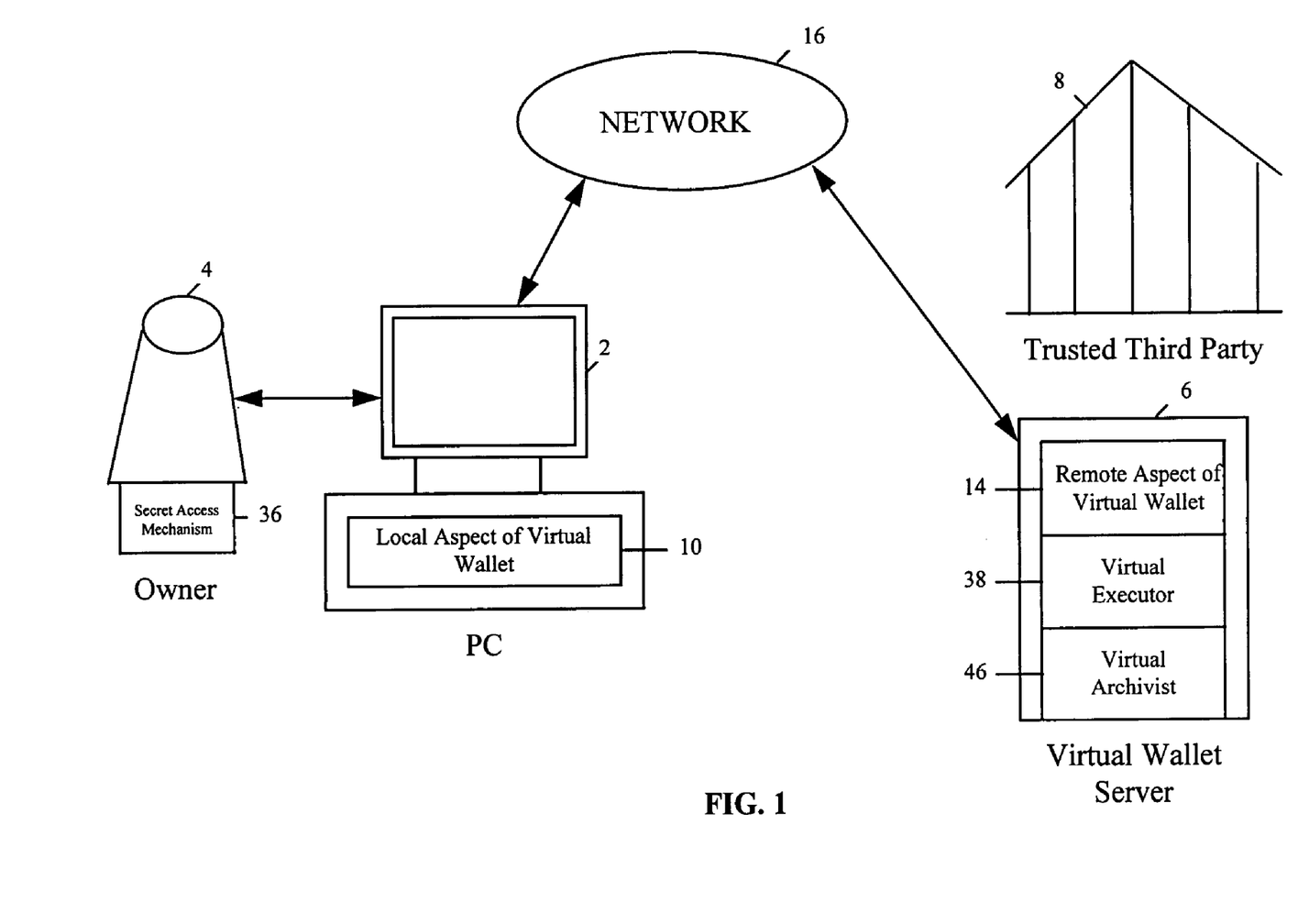
FIG. 1 shows schematically an overview of key components, and the flow of information between the key components, for an embodiment of the present invention.

Referring now in detail to an embodiment of the present invention, an example of which is illustrated in the accompanying drawings, the present invention provides a system and method for securely storing, updating and managing an owner's electronic data and accessing the stored data by a trusted third party upon the occurrence of an event, such as the death or incompetence of the owner. FIG. 1 shows schematically an overview of key components, and the flow of information between the key components, for an embodiment of the present invention. The system for an embodiment of the present invention makes use of application software, such as a virtual wallet, which resides, for example, on one or both of the PC 2 of the owner 4 and a server 6 of a financial institution 8, such as a bank.

Figure 2:
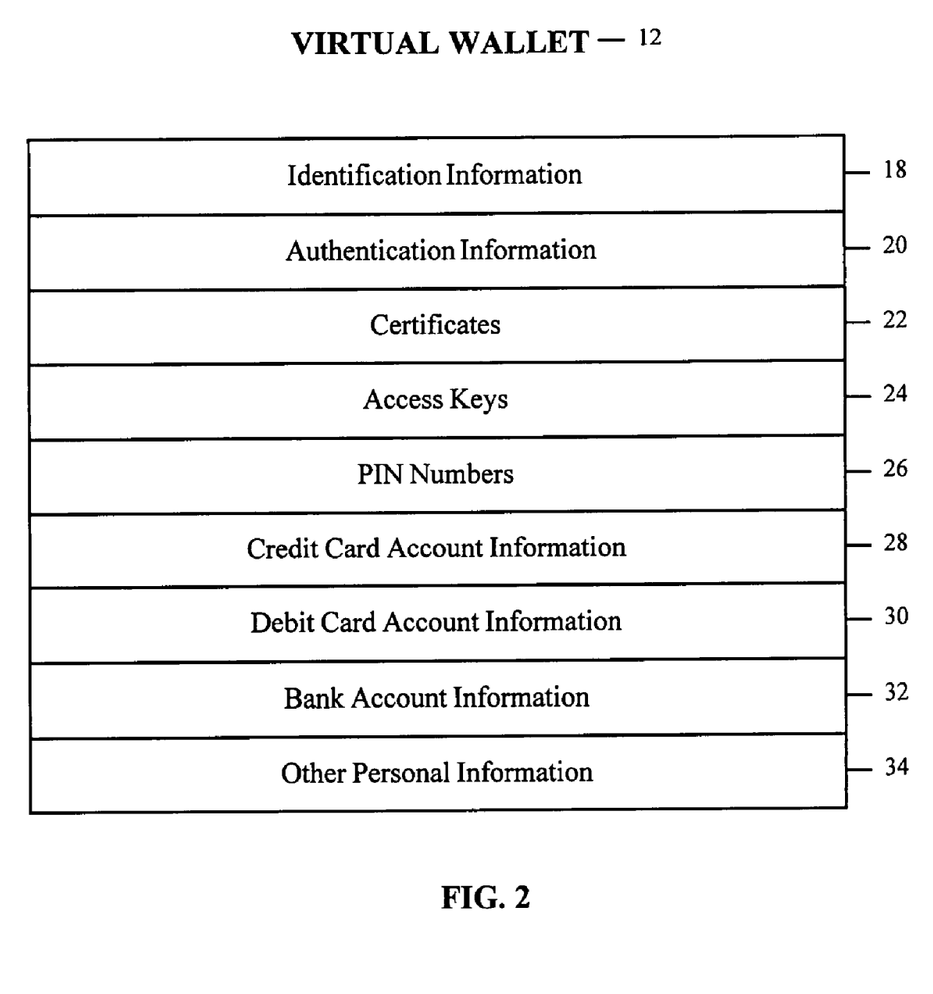
FIG. 2 is a table which illustrates examples of the types of data which the owner stores in the owner's virtual wallet for an embodiment of the present invention.

FIG. 2 is a table which illustrates examples of the types of data which the owner stores in the owner's virtual wallet for an embodiment of the present invention. Referring to FIGS. 1 and 2, a local aspect 10 of the virtual wallet 12 residing on the owner's PC 2 allows the owner 4 to remotely gain access to the entire virtual wallet 14, which resides on the wallet server 6, over a network 16, such as the Internet. The local aspect 10 updates the remote aspect 14 of the virtual wallet 12 with the latest information from the local aspect when the local wallet is on-line to the server 6. Types of information which may be stored for the owner 4 in the virtual wallet 12 include, for example, identification information 18, authentication information 20, certificates 22, access keys 24, personal identification numbers (PIN's) 26, credit card account information 28, debit card information 30, bank account information 32, and other personal information 34, such as the owner's will, legal documents, insurance policies, brokerage account information, digital bearer instruments, digital stock certificates, and digital bond certificates.

Referring further to FIG. 1, a certificate or other similar authentication mechanism 36, such as a special PIN, password, or key, typically known only to the owner 4, allows the owner to gain access to the owner's electronic data securely stored in the virtual wallet 12. Generally, all of the digital services that are related to electronic commerce, such as public key cryptography, electronic documents, and digital signatures, rely on the person who holds the certificate or who owns the wallet being present to access them. It can be as simple, for example, as a user name and password, if the owner 4 actually keeps the owner's password private. On the other hand, it can be as complicated as a fingerprint scanner requiring a live thumbprint that has, for example, a body temperature. When the owner 4 dies, access to the owner's decryption infrastructure is likewise gone, and the access, in effect, dies with the owner.

A functionality within the virtual wallet for an embodiment of the present invention provides a solution to the problem by maintaining a file with all of this critical information that can be opened by a trusted third party, such as the financial institution 8, e.g., a bank, upon the death of the owner 4. This allows for the settlement of all accounts and for access to information by the successors in interest of the owner 4. Referring again to FIG. 1, this aspect of an embodiment of the present invention, referred to as the virtual executor 38, allows access to the owner's secure electronic data stored in the electronic wallet 12 once the owner 4 is, for example, deceased or legally incompetent or otherwise incapable of conducting her own affairs. Thus, the virtual executor 38 provides for the owner's secure information to be passed on to the owner's successors in interest after the owner 4 is, for example, deceased, incompetent, or otherwise unable to act on the owner's own behalf.

Figure 3:
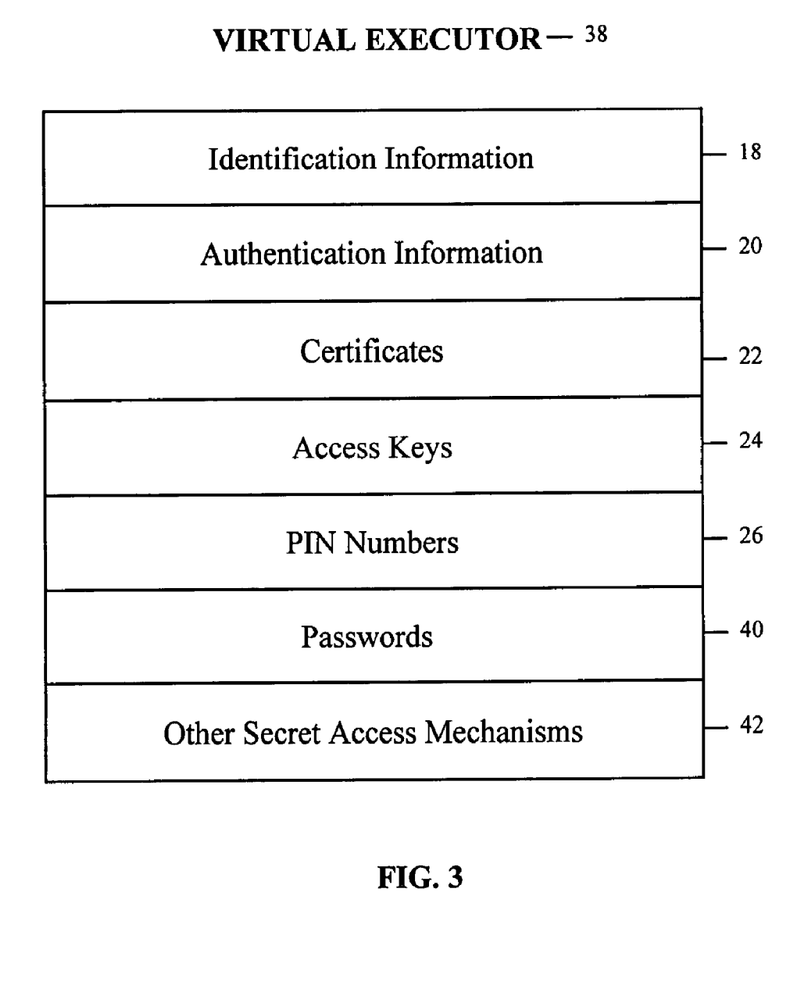
FIG. 3 is a table which shows examples of the types of information escrowed by the virtual executor for an embodiment of the present invention.

The virtual executor 38 functionality for an embodiment of the present invention provides a service that escrows the keys and/or similar access devices or mechanisms, so that when the owner 4 dies, the keys become part of the owner's estate and can be handled as part of the typical estate settlement. FIG. 3 is a table which shows examples of the types of information escrowed by the virtual executor 38 for an embodiment of the present invention. The types of information escrowed by the virtual executor 38 include, for example, identification information 18, authentication information 20, certificates, 22, access keys 24, PIN numbers 26, passwords 40, and other similar secret access mechanisms 42. Without the virtual executor 38, all of the owner's information that is protected, for example, by authentication information 20, keys 24, special PIN's 26, or passwords 40 may be forever locked up with the unavailability of the owner 4 to act, who is typically the only one who knows how to access the information stored in the virtual wallet 12.

In an embodiment of the present invention, the owner's secret keys and/or other similar access devices are escrowed with the trusted third party which is, for example, the financial institution or bank 8, through the virtual executor 38, which is a type of virtual trust for the owner 4. The owner 4 escrows the owner's secret keys with the trusted third party 8, and the escrowed keys become part of the owner's estate. In other words, the escrowed keys are similar to the owner's will and all the other trusts that the owner 4 may have. For example, the owner 4 can also have electronic finds, such as stored value or digital coins, that require the owner's thumbprint to decrypt. Upon the occurrence of an event, such as the death or incompetence of the owner, the system and method for an embodiment of the present invention provides a way for the trusted third party 8 to obtain access to the value that is stored, for example, in those coins.

Figure 4:
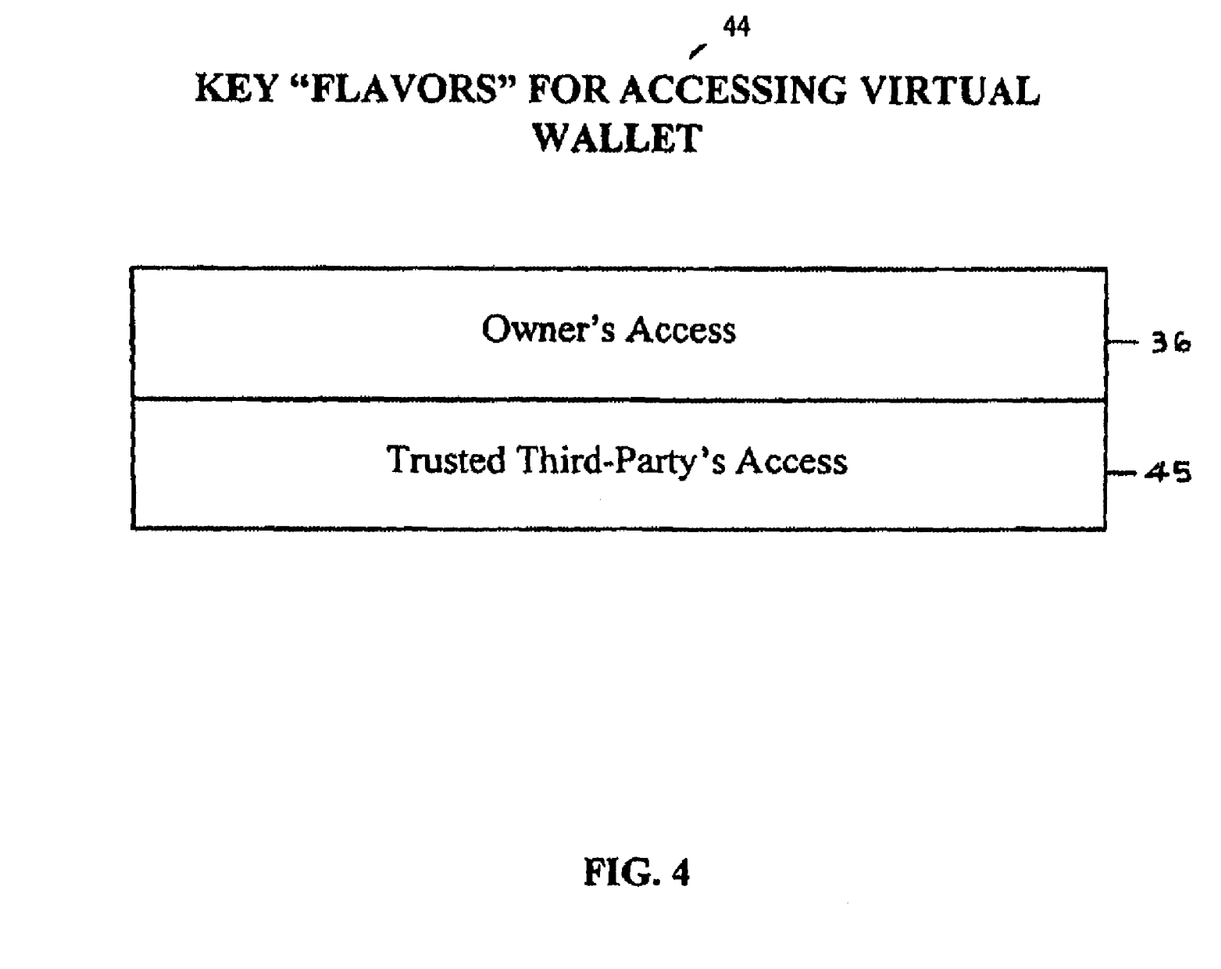
FIG. 4 is a table which shows examples of the two "flavors" for the key for accessing the owner's virtual wallet for an embodiment of the present invention.

The system and method for an embodiment of the present invention provides, for example, a technology infrastructure associated with the virtual wallet 12 for accessing the contents of the virtual wallet, such as the owner's stored value in the wallet. The technology infrastructure associated with the virtual wallet 12 provides a key that is durable and has, for example, two "flavors." FIG. 4 is a table which shows examples of the two "flavors" for the key 44 for accessing the owner's virtual wallet 12 for an embodiment of the present invention. A first flavor of the key is the owner's secret access mechanism 35, which is necessary for the owner 4 to use every day for access to the virtual wallet 12. A second flavor 45 of the key is held by the trusted third party 8 to give the third party access to the virtual wallet 12. The second flavor 45 is, in effect, like a master key that gives the trusted third party 8 access to the contents of the owner's virtual wallet 12 once the owner 4 is no longer able to use the owner's primary access device 36.

Figure 5:
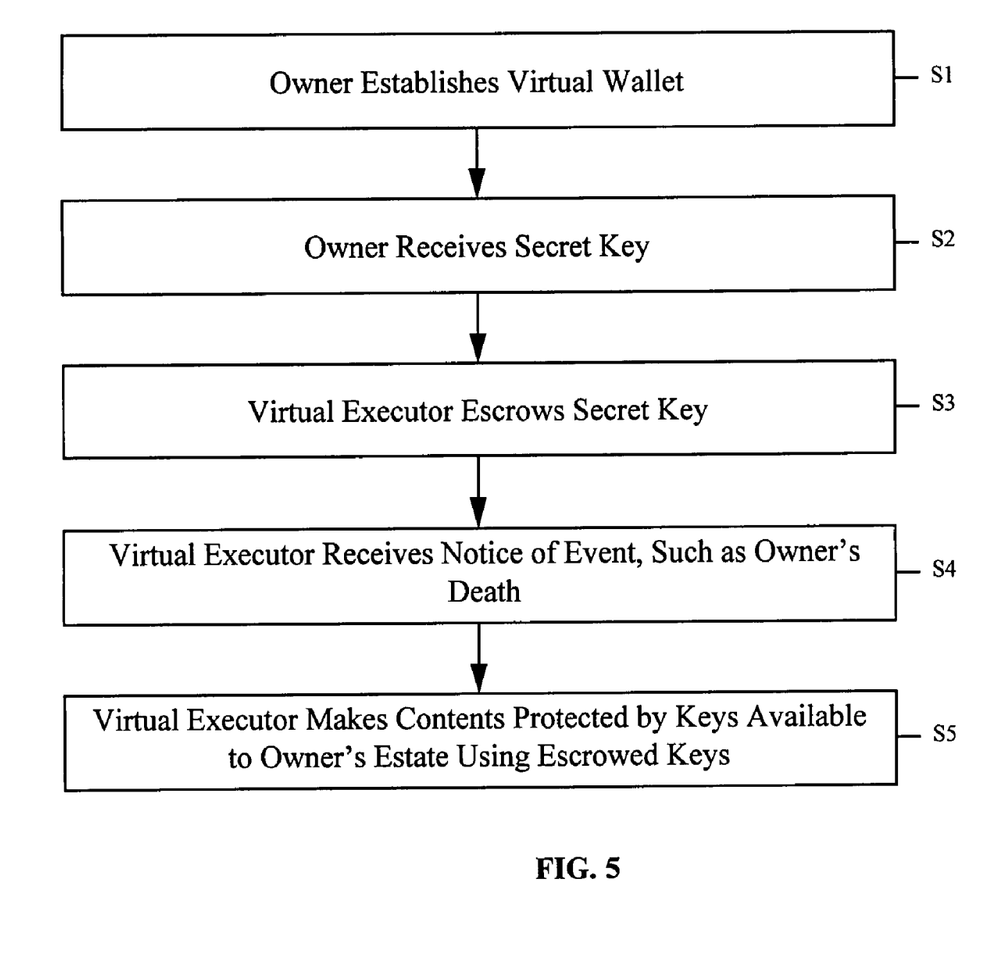
FIG. 5 is a flow chart which amplifies the flow of information shown in FIG. 1 and provides further detail regarding the process of escrowing and accessing the owner's stored data for an embodiment of the present invention.

FIG. 5 is a flow chart which amplifies the flow of information shown in FIG. 1 and provides further detail regarding the process of escrowing and accessing the owner's stored data for an embodiment of the present invention. At S1, the owner 4 at a terminal, such as the owner's PC 2, establishes the virtual wallet 12. At S2, the owner automatically receives a new key 36 that gives the owner access to the wallet. At S3, starting with that key 36, a key escrow is automatically created with the trusted third party 8 by the virtual executor functionality 38 within the virtual wallet 12. The virtual executor functionality 38 automatically assures that the key 36 is appropriately escrowed. When an event occurs, such as the death of the owner 4, the owner's personal representative presents the appropriate notice about the owner's death, such as a death certificate, to the trusted third party 8 at S4, and the virtual executor 38 is assured that the owner is actually deceased. At S5, the virtual executor 38 uses its set of keys to make available to the estate all of the content that the owner 4 has protected by those keys. For example, if it is the owner's access to digital funds within the owner's virtual wallet 12, one of those keys will allow access to those funds.

In an embodiment of the present invention, in addition to secret keys, the owner 4 may also have various other information stored in the virtual wallet 12, such as the owner's will 34. The owner 4 may have stored, for example, an electronic copy of the owner's will 34 in the data archive associated with the owner's virtual wallet 12 as the official copy of the will. Referring again to FIG. 5, at the death of the owner 4, the owner's personal representative takes a copy of the appropriate death certificate and/or other appropriate documentation to prove the authority of the personal representative and physically presents the documentation to the trusted third party 8. When the virtual executor 38 is assured of the owner's death, the virtual executor likewise uses its set of keys to make the owner's stored will 34 available to the owner's estate at S5. Demonstrating and documenting the owner's death, as well as the authority of the owner's personal representative to act upon the owner's death, to the trusted third party 8 is a part of the security mechanism for an embodiment of the present invention.

Figure 6:
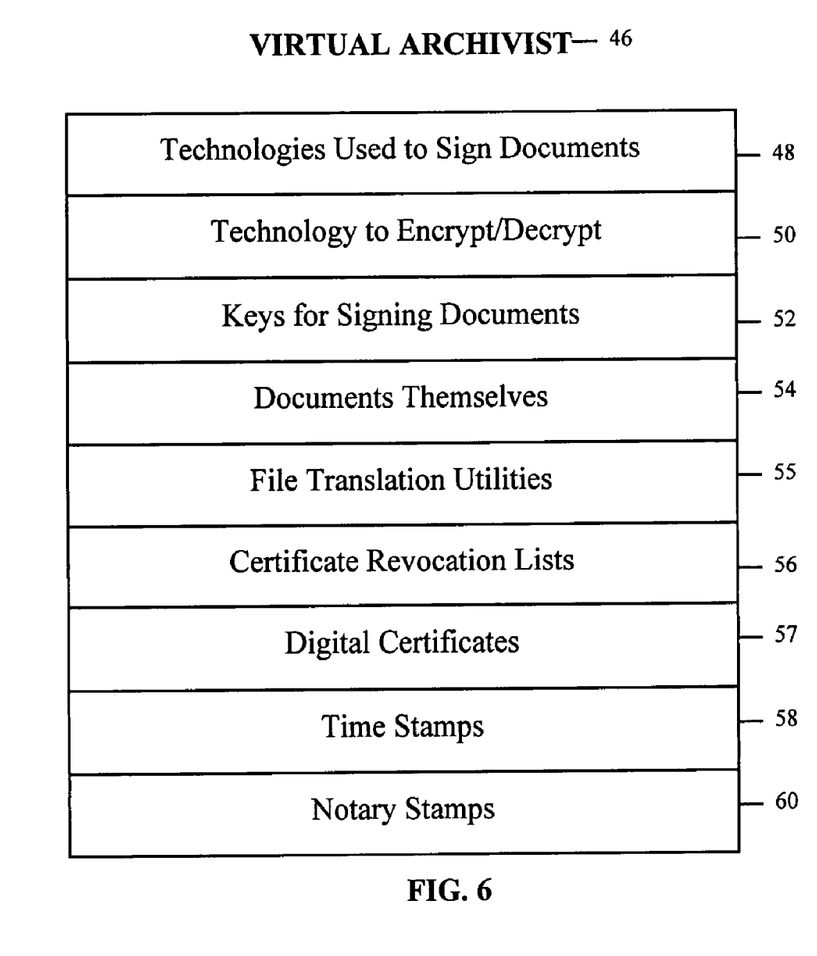
FIG. 6 is a table which shows examples of the types of technologies which are updated by the virtual archivist for an embodiment of the present invention.

A further aspect for an embodiment of the present invention is a functionality within the virtual wallet 12, referred to as the virtual archivist, which provides for access and updating of the electronic information stored in the virtual wallet, for example, when various technologies associated with the stored information become outdated. FIG. 6 is a table which shows examples of the types of technologies which are updated by the virtual archivist for an embodiment of the present invention. The virtual archivist 46 updates technologies, such as those used to sign documents 48, encrypt/decrypt documents 50, keys 52, read the documents themselves 54, file translation utilities used to make the documents themselves accessible 55, and certificate revocation lists 56, to conform to changes in technology. The virtual archivist 46 also updates verification and validation technologies to ensure that keys 52, digital certificates 57, and notary stamps 60 are valid as of the time stamp date 58 associated with the documents themselves. Further, in an embodiment of the present invention, the virtual archivist 46 takes the information with the outdated technology and updates it to make it compatible with the latest technology, while maintaining the integrity of the original information. Thus, the virtual archivist 46 enables all information to conform to the latest technological advances.

For example, as electronic documents become, in effect, the original documents, the owner's will 34 stored electronically in the data archive part of the owner's virtual wallet 12 becomes the owner's official will. The owner's will written today may be written in an application, such as Word 7.0, which runs on an Intel Pentium computer with an operating system, such as Windows NT 4.0. If the owner 4 dies at a much later time in the future, it may be unlikely that a copy of Word 7.0, or an Intel computer, or a copy of NT 4.0 will be readily available. Therefore, when the owner 4 dies in the future, in spite of the fact that the owner's will was signed and encrypted and protected and the owner has stored and archived all the keys so that the virtual executor has access to them, it may still not be possible to read the file because the access mechanisms have ceased to exist.

In an embodiment of the present invention, the virtual archivist 46 is, in effect, a responsibility functionality. As the owner's files are archived in the data archive associated with the owner's virtual wallet 12, the virtual archivist 46 maintains the stored files in a way that the files can be accessed over time by automatically updating the stored data and the technologies associated with the data as the technologies change over time. The virtual archivist 46 is part of one of the functionalities within the virtual wallet 12 that is the personal information archive. As the owner 4 inputs the owner's data into the data archive associated with the virtual wallet 12, the virtual archivist 46 is automatically informed of what the owner's data is and automatically formats the data, so the data can continue to be useful.

Various preferred embodiments of the invention have been described in fulfillment of the various objects of the invention. It should be recognized that these embodiments are illustrative of the principles of the present invention. Numerous modifications and adaptations thereof will be readily apparent to those skilled in the art without departing from the spirit and scope of the present invention. Accordingly, the invention is limited only by the following claims.

What is claimed is:

1. A method for securely storing data for an owner, comprising:
   storing the data for the owner consisting at least in part of information relating to the owner's estate by entering the data on a virtual wallet application for the owner, the virtual wallet application having a local aspect residing on a terminal of the owner and a remote aspect residing on a server of a trusted third party coupled to the terminal via a network, the virtual wallet application also having a virtual executor function, and the virtual wallet application also being configured at least in part for storing data representing at least one of a payment mechanism and electronic funds;
   automatically assigning a primary aspect of a secret access device for the virtual wallet application to the owner by the virtual wallet application for accessing the stored data;
   automatically escrowing a secondary aspect of the secret access device for the virtual wallet application by the virtual executor function conditioned on the occurrence of an event that renders the owner incapable of acting on the owner's own behalf;
   periodically updating the remote aspect of the virtual wallet application with the data stored on the local aspect by a virtual archivist function of the virtual wallet application via the network;
   periodically reformatting the data stored on the remote aspect of the virtual wallet application by the virtual archivist function to conform to succeeding methods of accessing the stored data;
   receiving verification of the occurrence of the event by the trusted third party from a personal representative of the owner upon the occurrence of the event; and
   accessing the stored data by the trusted third party on behalf of the owner's personal representative with the escrowed secret access device.

2. The method of claim 1, wherein entering the data further comprises entering the data by the owner at the terminal.

3. The method of claim 1, wherein the terminal further comprises a personal computer.

4. The method of claim 1, wherein the trusted third party's server further comprises a financial institution server.

5. The method of claim 4, wherein the financial institution further comprises a bank.

6. The method of claim 1, wherein the network further comprises a private network.

7. The method of claim 1, wherein the network further comprises a public network.

8. The method of claim 7, wherein the public network further comprises the internet.

9. The method of claim 1, wherein entering the data further comprises entering the data on the local aspect of the virtual wallet application residing on the terminal.

10. The method of claim 1, wherein storing the data further comprises storing at least one category of information by the virtual wallet application for the owner selected from a group of information consisting of identification information, authentication information, certificate information, access key information, PIN number information, credit card account information, debit card information, bank account information, and other personal information.

11. The method of claim 1, wherein automatically assigning the primary aspect of the secret access device further comprises automatically assigning the primary aspect of the secret access device to the owner at the terminal.

12. The method of claim 11, wherein automatically assigning the primary aspect of the secret access device further comprises automatically assigning the primary aspect of the secret access device by the remote aspect of the virtual wallet application residing on the server coupled to the terminal.

13. The method of claim 12, wherein the terminal further comprises a personal computer.

14. The method of claim 12, wherein automatically assigning the primary aspect of the secret access device further comprises automatically sending information about the secret access device to the owner at the terminal coupled to the server over the network.

15. The method of claim 14, wherein the network further comprises a private network.

16. The method of claim 14, wherein the network further comprises a public network.

17. The method of claim 16, wherein the public network further comprises the internet.

18. The method of claim 1, wherein automatically escrowing the secondary aspect of the secret access device further comprises automatically storing at least one type of secret access information selected from a group of secret access information consisting of identification information, authentication information, certificate information, access key information, PIN number information, and password information.

19. The method of claim 1, wherein automatically escrowing the secondary aspect of the secret access device further comprises automatically escrowing decryption infrastructure for the owner.

20. The method of claim 19, wherein automatically escrowing decryption infrastructure further comprises automatically storing at least one decryption infrastructure selected from a group of decryption infrastructure consisting of public key cryptography infrastructure, electronic document infrastructure, digital signature infrastructure, user name infrastructure, password infrastructure, fingerprint scanner infrastructure, and secret key infrastructure.

21. The method of claim 1, further comprising automatically updating technology aspects of the stored data.

22. The method of claim 21, wherein automatically updating the technology aspects further comprises automatically updating technology aspects of the data by the virtual archivist function of the virtual wallet application.

23. The method of claim 22, wherein automatically updating the technology aspects further comprises automatically updating the technology aspects by the virtual archivist function of the virtual wallet application on the server of the trusted third party.

24. The method of claim 23, wherein the trusted third party further comprises a financial institution.

25. The method of claim 24, wherein the financial institution further comprises a bank.

26. The method of claim 23, wherein automatically updating the technology aspects further comprises automatically updating at least one technology aspect of the data selected from a group of technology aspects consisting of technology related to signing a document, encryption technology, technology related to a key for signing a document, technology related to a document itself, technology related to a certificate revocation list, technology related to a time stamp, and technology related to a notary stamp.

27. The method of claim 1, wherein storing the data further comprises receiving the data from another party by the virtual wallet application for the owner.

28. The method of claim 27, wherein receiving the data further comprises receiving the data by the virtual wallet application for the owner by electronic mail.

29. A method for securely storing data for an owner, comprising:
    storing the data for the owner consisting at least in part of an electronic copy of the owner's will on a virtual wallet application for the owner, the virtual wallet application having a local aspect residing on a terminal of the owner and a remote aspect residing on a server of a trusted third party coupled to the terminal via a network, the virtual wallet application also having a virtual executor function, and the virtual wallet application also being configured at least in part for storing data representing at least one of a payment mechanism and electronic funds;
    automatically assigning a secret device to the owner for accessing the stored data on the virtual wallet application, wherein automatically assigning the secret device further comprises automatically assigning the secret device by the virtual wallet application with at least two access aspects comprising an owner's access aspect and a trusted third party's access aspect;
    automatically escrowing the trusted third party's access aspect by the virtual executor function of the virtual wallet application for the owner conditioned on the occurrence of an event comprising one of the owner's death and the owner's incompetence;
    periodically updating the remote aspect of the virtual wallet application with the data stored on the local aspect by a virtual archivist function of the virtual wallet application via the network;
    periodically reformatting the data stored on the remote aspect of the virtual wallet application by the virtual archivist function to conform to succeeding methods of accessing the stored data;
    receiving verification of the occurrence of the event by the trusted third party from a personal representative of the owner upon the occurrence of the event; and
    providing access to the stored data by the trusted third party for the owner's personal representative with the trusted third party's access aspect of the escrowed secret device.

30. The method of claim 29, wherein automatically assigning the owner's access aspect further comprises automatically sending the owner's access aspect to the owner.

31. The method of claim 29, wherein automatically escrowing the trusted third party's access aspect further comprises automatically storing the trusted third party's access aspect by the virtual executor function of the virtual wallet application on the server of the trusted third party.

32. The method of claim 31, wherein the trusted third party server further comprises a financial institution computer.

33. The method of claim 32, wherein the financial institution further comprises a bank.

34. A method for securely storing data for an owner, comprising:
    storing the data for the owner consisting at least in part of information relating to the owner's estate on a virtual wallet application residing at least in part on a trusted third party's server and at least in part on the owner's personal computer coupled to the server via a network, the virtual wallet application also being configured at least in part for storing data representing at least one of a payment mechanism and electronic funds;
    automatically assigning a primary aspect of a secret device to the owner for accessing the stored data;
    automatically escrowing a secondary aspect of the secret device by a virtual executor function of the virtual wallet application conditioned on the occurrence of an event consisting of one of the owner's death and the owner's incompetence;
    periodically updating the part of the virtual wallet application residing on the trusted third party's server with the data stored on the part of the virtual wallet application residing on the owner's personal computer by a virtual archivist function of the virtual wallet application via the network;
    periodically reformatting the data stored on the remote aspect of the virtual wallet application by the virtual archivist function to conform to succeeding methods of accessing the stored data;
    receiving verification of the occurrence of the event by the virtual executor function from a personal representative of the owner via the trusted third party; and
    providing access for the personal representative to the stored data with the escrowed secret device.

35. A system for securely storing data for an owner, comprising:

a terminal of the owner with a virtual wallet application having a local aspect residing thereon and a server of a trusted third party with a remote aspect residing thereon coupled to the terminal via a network and capable of storing the data consisting at least in part of information related to the owner's estate for the owner, the virtual wallet application also being configured at least in part for storing data representing at least one of a payment mechanism and electronic funds, the virtual wallet application also having a virtual archivist function adapted for periodically updating the remote aspect of the virtual wallet application with the data stored on the local aspect via the network, and the virtual archivist function also being adapted for periodically reformatting the data stored on the remote aspect of the virtual wallet application to conform to succeeding methods of accessing the stored data;

wherein the virtual wallet application is adapted for automatically assigning a primary aspect of a secret access device for the virtual wallet application to the owner for accessing the stored data;

a virtual executor function of the virtual wallet application preprogrammed for automatically escrowing a secondary aspect of the secret access device for the virtual wallet application conditioned upon the occurrence of an event comprising one of the owner's death and the owner's incompetence, and upon receiving verification of the occurrence of the event via the trusted third party from a personal representative of the owner, for providing access to the stored data with the escrowed secondary aspect of the secret access device for the personal representative of the owner.

36. A method for securely storing data for an owner, comprising:

providing a virtual wallet application having a local aspect residing on a computing device of the owner and a remote aspect residing on a trusted third party's server, the virtual wallet application also being configured at least in part for storing data representing at least one of a payment mechanism and electronic funds;

assigning a primary aspect of a secret access device to the owner by the virtual wallet application for accessing both aspects of the virtual wallet application by the owner via the computing device coupled to the server over a network;

escrowing a secondary aspect of the secret access device by a virtual executor function of the virtual wallet application preprogrammed to utilize the secondary aspect to allow access to the owner's stored data only to an authorized representative of the owner's estate upon verification of an occurrence of a predefined event that renders the owner incapable of acting on the owner's own behalf;

allowing the owner at the computing device to store data consisting at least in part of information relating to the owner's estate on the local aspect of the virtual wallet application;

periodically updating the remote aspect of the virtual wallet application with the data stored on the local aspect by a virtual archivist function of the virtual wallet application via the network;

periodically reformatting the data stored on the remote aspect of the virtual wallet application by the virtual archivist function according to conform to succeeding methods of accessing the stored data; and if the occurrence of the predefined event is verified, allowing access for the authorized representative of the owner's estate to the owner's stored data by the virtual executor function utilizing the secondary aspect of the secret access device.

* * * * *